US012565560B2

(12) United States Patent
Süveges et al.

(10) Patent No.: US 12,565,560 B2
(45) Date of Patent: Mar. 3, 2026

(54) RELEASABLE COMPOSITIONS BASED ON POLYACETALS

(71) Applicant: DELO Industrie Klebstoffe GmbH & Co. KGaA, Windach (DE)

(72) Inventors: Bastian Süveges, Windach (DE); Robert Born, Windach (DE)

(73) Assignee: Delo Industrie Klebstoffe GmbH & Co. KGAA, Windach (DE)

( * ) Notice: Subject to any disclaimer, the term of this patent is extended or adjusted under 35 U.S.C. 154(b) by 603 days.

(21) Appl. No.: 18/004,475

(22) PCT Filed: Jul. 6, 2021

(86) PCT No.: PCT/EP2021/068572
§ 371 (c)(1),
(2) Date: Jan. 6, 2023

(87) PCT Pub. No.: WO2022/012996
PCT Pub. Date: Jan. 20, 2022

(65) Prior Publication Data
US 2024/0254278 A1 Aug. 1, 2024

(30) Foreign Application Priority Data
Jul. 16, 2020 (DE) .......................... 102020118813.7

(51) Int. Cl.
| | |
|---|---|
| *C08G 59/24* | (2006.01) |
| *B29C 64/40* | (2017.01) |
| *B33Y 10/00* | (2015.01) |
| *B33Y 70/00* | (2020.01) |
| *C08F 220/06* | (2006.01) |
| *C08F 220/28* | (2006.01) |
| *C08F 220/54* | (2006.01) |
| *C08F 283/06* | (2006.01) |
| *C08F 290/14* | (2006.01) |
| *C08G 2/30* | (2006.01) |
| *C08G 59/42* | (2006.01) |
| *C08G 59/50* | (2006.01) |
| *C08G 65/00* | (2006.01) |
| *C08G 65/18* | (2006.01) |
| *C08G 65/48* | (2006.01) |
| *C09J 5/06* | (2006.01) |
| *C09J 5/08* | (2006.01) |
| *C09J 171/02* | (2006.01) |

(52) U.S. Cl.
CPC .............. *C08G 59/24* (2013.01); *B29C 64/40* (2017.08); *C08F 220/06* (2013.01); *C08F 220/282* (2020.02); *C08F 220/54* (2013.01); *C08G 2/30* (2013.01); *C08G 59/42* (2013.01); *C08G 59/50* (2013.01); *C08G 65/18* (2013.01); *C09J 5/06* (2013.01); *C09J 5/08* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 5,932,682 | A | 8/1999 | Buchwalter et al. |
| 6,288,170 | B1 | 9/2001 | Waid |
| 9,441,127 | B2 | 9/2016 | Suzuki |
| 10,961,380 | B2 | 3/2021 | Okada et al. |
| 2016/0090494 | A1 | 3/2016 | Suzuki |
| 2016/0264822 | A1 | 9/2016 | Ito et al. |
| 2017/0298163 | A1 | 10/2017 | Clapper et al. |
| 2019/0119534 | A1 | 4/2019 | Koduma et al. |
| 2019/0211140 | A1 | 7/2019 | Reichvilser et al. |
| 2019/0382576 | A1 | 12/2019 | Okada et al. |
| 2021/0163667 | A1 | 6/2021 | Kramer et al. |

FOREIGN PATENT DOCUMENTS

| | | |
|---|---|---|
| CN | 105462361 A | 4/2016 |
| CN | 109642092 A | 4/2019 |
| CN | 110382573 A | 10/2019 |
| EP | 1914285 A1 | 4/2008 |
| JP | 2009108183 A | 5/2009 |
| JP | 2010248387 A | 11/2010 |
| JP | 2012153853 A | 8/2012 |
| WO | 2015053223 A1 | 4/2015 |
| WO | 2017132497 A1 | 8/2017 |
| WO | 2019145420 A1 | 8/2019 |

OTHER PUBLICATIONS

Ionescu et al., "Polyacetal Polyols for Polyurethanes," Journal of Polymers and the Environment, 2009, 123-130, 17.

*Primary Examiner* — Ha S Nguyen
(74) *Attorney, Agent, or Firm* — McNees Wallace & Nurick

(57) ABSTRACT
The invention relates to a curable composition comprising at least one curable resin component and at least one curing agent and/or one initiator for the polymerization of the curable resin compound. Moreover, the composition comprises at least one non-linear polyacetal-bridged resin component having a large number of acetal functions and functional groups of resin component (A).

23 Claims, No Drawings

RELEASABLE COMPOSITIONS BASED ON POLYACETALS

FIELD OF THE INVENTION

The present invention relates to polyacetal-based curable compositions that, after curing, can be detached and/or dissolved by exposure to water and/or moisture.

Moreover, the invention relates to a method of detaching and/or dissolving joint connections, encapsulations and coatings made of said compositions.

TECHNICAL BACKGROUND

In the state of the art, various possibilities for detaching joint connections are known. Specifically for expensive parts, being able to detach or dissolve the joint connections is useful to allow for a post-processing.

In some applications such as 3D printing, the fabrication of more complex additively manufactured structures often requires support structures. They allow for applying curable compositions and can be washed out or detached afterwards. Particularly water-soluble polymers, waxes or thermoplastic compositions can be used as a material for the support structures. A disadvantage of these materials is the low degree of crosslinking resulting in disadvantageous mechanical properties, in particular low cohesion.

Detachment of the support structures can be caused by various physical or chemical signals. For example, joint connections can be chemically re-dissolved by means of solvents, acids or bases. This is of disadvantage with regard to both the parts and environmental and work safety aspects.

Alternatively, there exist physical methods of detaching adhesive bonds. For example, compositions having a high content of thermoplastics can be transferred, by heating above the glass transition temperature of the composition, into a state in which the joined components can be detached from the composition by peeling. This method often leaves residues and fails when used for more complex part geometries.

From U.S. Pat. No. 6,288,170 epoxy-containing formulations are known which, apart from a curing agent, additionally contain heat-expandable microspheres that release gasses at elevated temperatures thus allowing the joint to be detached. The fact that high filling levels are required to achieve a high degree of detachment is a disadvantage. At the same time, the microspheres show low shearing stabilities, which negatively affects the processability of such compositions.

From EP 1 914 285 A1 adhesive formulations are know which can be detached from substrates by applying an electric voltage. The fact that the formulations need to have a high content of ionic liquids to be re-dissolvable, which largely restricts the range of formulations, is a disadvantage of this approach. In addition, the use of electrically conductive substrates is mandatory to re-dissolve the adhesive.

WO 2017/132497 A1 discloses fluorescent photo-switchable coumarin-based epoxy compositions. By irradiation with wavelengths of less than 300 nm, the polymerized compositions can be transferred into a less cross-linked state in which a detachment is possible. This approach requires specific, commercially non-available raw materials and allows only for a narrow range of formulations. Due to their route of synthesis, the required raw materials have a high chlorine content and are thus not suitable for use in the electronics field. Additionally, a radiolucent substrate is mandatory to detach the compositions.

For example, formulations containing epoxy resins carrying acetal bonds are known from U.S. Pat. No. 5,932,682. The formulations contain anhydrides as curing agents and are intended for encapsulating electronic parts. After 1 week of storage under temperature and moisture conditions, mixtures of acetal-containing epoxides and an acetal-free cycloaliphatic epoxide show only a moderate decrease in the glass transition temperature without dissolving. Thus, the post-processing of parts is very time- and energy-consuming. Organic solvents are mandatory to dissolve the composition.

US 2017 0 298 163 A1 discloses formulations containing acetal-functional crosslinking agents carrying (meth)acrylate groups. Only linear crosslinking agents are described. In general, the formulations have a glass transition temperature of less than 50° C. and are intended for use as pressure-sensitive adhesives. By using acetal-based (meth)acrylates that are at most difunctional it is not possible to formulate compositions with a high resistance and/or glass transition temperature. Thus, the pressure-sensitive polymer is not suitable for processes in the semiconductor industry.

The structure of hydroxy-functional polyacetals as curing agents for the formation of polyurethanes is known from the scientific publication by M. Ionescu, S. Sinharoy and Z. S. Petrović, "Polyacetal Polyols for Polyurethanes", *Journal of Polymers and the Environment* 2009, 17, 123-130. The polyacetals are described as biologically degradable and/or degradable in the presence of acids. The publication does not describe a synthesis of polyacetals that carry functional groups other than alcohols and could, for example, be incorporated in radically or cationically polymerizable compositions. In addition, no information about the conditions is provided, and the proportions of such compounds in adhesive compositions are not specified either, which are necessary to achieve a detachment of the compositions from substrates. Moreover, the polyacetals obtained by the described synthesis cannot be used for formulating storage-stable compositions due to the amine-based catalysts contained in the compositions.

US 2019/0119534 A1 describes the reaction of vinyl ethers with monovalent carboxylic acids or alcohols to form polyacetals. In the disclosure, heat-dissolvable compositions can be formulated by adding thermoplastic materials. The compositions have softening points of 100° C. or more; however, they are exclusively heat-curable and have poor cohesive properties. Detachment by exposure to moisture is not intended.

Disadvantages of the detachable compositions described in the state of the art are that they need either harsh conditions and/or longer periods of time to re-dissolve, cannot be detached without leaving residues or contain large proportions of compounds which do not polymerize into the network of the composition.

SUMMARY OF THE INVENTION

It is an object of the invention to overcome the disadvantages of the compositions known from the state of the art and to provide curable compositions that, after curing, can be detached or re-dissolved at low temperatures in an aqueous medium without leaving any residues.

Moreover, the compositions of the present invention are intended to have a wide range of mechanical properties after curing. In particular, variable glass transition temperatures are to be achieved with said compositions.

According to the present invention, these objects will be achieved by a curable composition according to Claim 1.

Advantageous embodiments of the composition of the present invention are specified in the subclaims, which can optionally be combined with each other.

The invention further relates to a method of detaching and/or dissolving joint connections, encapsulations and coatings made of the compositions of the present invention.

Another object of the invention is the use of the composition of the present invention as an adhesive or sealant for bonding, encapsulation, sealing or coating of substrates to be detached again.

The compositions of the present invention are especially suitable for temporary joining applications.

The curable composition of the present invention is liquid at room temperature and can be cured by various curing mechanisms such as actinic radiation and/or heat.

The composition comprises at least the following components:

A) at least one curable resin component selected from the group consisting of epoxy-containing compounds, oxetanes, vinyl ethers, (meth)acrylates and combinations thereof;

B) at least one curing agent and/or one initiator for the polymerization of the curable resin component; and C) at least one polyacetal-bridged resin component obtainable by reacting at least one at least difunctional vinyl ether (c1) with at least one at least difunctional alcohol (c2) to form a polyacetal intermediate product having more than two terminal vinyl ether groups or more than two terminal hydroxyl groups, and a) reacting the polyacetal intermediate product having more than two terminal vinyl ether groups with at least one compound of mixed functionality (c3) having at least one hydroxyl group or one amine group and at least one further functional group of resin component (A) or a group that can be polymerized therewith; or b) reacting the polyacetal intermediate product having more than two terminal hydroxyl groups with a hydroxyl group-reactive linker and further reacting it with the compound of mixed functionality (c3) or an at least difunctional resin component (A); or c) reacting the polyacetal intermediate product having more than two terminal hydroxyl groups with a compound of mixed functionality (c3) having at least one isocyanate group and another functional group of resin component (A) or a group that can be polymerized therewith.

Preferably, the composition comprises a resin component (A) with an epoxy-containing compound and/or an oxetane and a curing agent (B1) from the group of amines and/or anhydrides.

Alternatively, the composition can comprise an epoxy-containing compound, an oxetane and/or a vinyl ether as resin component (A) and an initiator for cationic polymerization.

According to an embodiment, the composition can comprise a radically curable (meth)acrylate compound as resin component (A) and an initiator for radical polymerization, either alone or in combination with the above-mentioned resin components and curing agents.

According to another embodiment, resin component (A) can thus comprise an epoxy-containing compound and/or an oxetane and a compound that can be radically cured by radiation, or a hybrid compound having epoxy groups and groups that can be radically cured by radiation. Furthermore, the composition can comprise a curing agent from the group of amines and/or anhydrides and additionally an initiator for radical polymerization.

The polyacetal-bridged resin component (C) preferably has a molecular weight in the range of 2,000-20,000 g/mol, preferably 2,000-8000 g/mol. The molecular weight can be determined according to ISO 16014-2.

More preferably, the polyacetal-bridged resin component (C) is present in the composition in a proportion of at least 20 wt-%, preferably in a proportion of at least 40 wt-% and particularly preferably in a proportion of at least 50 wt-%, each based on the total weight of the composition.

Moreover, the composition can comprise an accelerator from the group of blowing agents and organic acids promoting the detachability and dissolubility of the composition when exposed to moisture and temperature.

The invention also comprises a method of forming and re-dissolving a joint connection, an encapsulation, a support structure or a coating, comprising the following steps:

a composition of the present invention is applied to a first substrate and optionally brought into contact with another substrate while forming an adhesive joint;

the composition is cured by exposure to heat, light and/or moisture, thereby forming a cured joint connection, an encapsulation, a support structure or a coating; and the cured composition is exposed to moisture during a predetermined period of time at a predetermined temperature, whereby the composition is dissolved and/or detached from the first and optionally the second substrate.

Another object of the present invention is the use of the composition of the present invention as a temporary support material for additively manufactured structures.

DETAILED DESCRIPTION OF PREFERRED EMBODIMENTS

Hereinafter, the invention is described in detail and by means of examples, which, however, should not be construed as limiting.

"Liquid", in the sense of the invention, means that the loss modulus $G''$ at 23° C. determined by measuring the viscosity is larger than the storage modulus $G'$ of the composition concerned.

The compositions are considered as detachable if, after curing, they can be detached from the substrate without leaving any residues when exposed to moisture and temperature.

The compositions are considered as dissolvable if, after curing, they completely dissolve when exposed to moisture and temperature.

If the indefinite article "a" or "an" is used, it also comprises the plural form "one or more" as far as this is not explicitly excluded.

"At least difunctional" means that two or more units of the functional group mentioned are contained per molecule.

"Of mixed functionality" means that at least two different functional groups are contained per molecule.

All parts by weight mentioned below are based on the total weight of the composition if not indicated otherwise.

Component (A): Resin

According to the present invention, resin component (A) comprises at least one curable, preferably at least difunctional resin component selected from the group consisting of epoxy-containing compounds, oxetanes, vinyl ethers, (meth) acrylates and combinations thereof.

Epoxy-Containing Compounds (A1)

The epoxy-containing compound (A1) in the compositions of the present invention preferably comprises one or more at least difunctional epoxy-containing compounds. Here, "at least difunctional" means that the epoxy-containing compound contains at least two epoxy groups. For example, component (A1) can comprise cycloaliphatic epoxides, aromatic and aliphatic glycidyl ethers, glycidyl esters or glycidyl amines and mixtures thereof.

Difunctional cycloaliphatic epoxy resins are known in the state of the art and contain compounds carrying both a cycloaliphatic group and at least two oxirane rings. Exemplary representatives are 3-cyclohexenylmethyl-3-cyclohexyl carboxylate diepoxide, 3,4-epoxycyclohexylalkyl-3', 4'-epoxycyclohexane carboxylate, 3,4-epoxy-6-methylcyclohexylmethyl-3',4'-epoxy-6-methylcyclohexane carboxylate, vinylcyclohexene dioxide, bis(3,4-epoxycyclohexylmethyl)adipate, dicyclopentadiene dioxide and 1,2-epoxy-6-(2,3-epoxypropoxy)hexahydro-4,7-methane indane and mixtures thereof.

Aromatic epoxy resins can also be used in the compositions of the present invention. Examples of aromatic epoxy resins are bisphenol-A epoxy resins, bisphenol-F epoxy resins, phenol-novolac epoxy resins, cresol-novolac epoxy resins, biphenyl epoxy resins, 4,4'-biphenyl epoxy resins, divinylbenzene dioxide, 2-glycidylphenyl glycidyl ether, naphthalenediol diglycidyl ether, glycidyl ether of tris(hydroxyphenyl)methane and glycidyl ether of tris(hydroxyphenyl)ethane and mixtures thereof. In addition, all completely or partially hydrogenated analogues of aromatic epoxy resins can be used.

Isocyanurates substituted with epoxy-containing groups and other heterocyclic compounds can also be used in the compositions of the present invention. Examples are triglycidyl isocyanurate and monoallyldiglycidyl isocyanurate.

In addition, polyfunctional epoxy resins of all resin groups named, viscoplastic epoxy resins and mixtures of various epoxy resins can be used in the compositions of the present invention.

A combination of several epoxy-containing compounds at least one of which is difunctional or of a higher functionality is also in the sense of the invention.

In addition to the at least difunctional epoxy-containing compounds monofunctional epoxides can be used as reactive diluents.

Examples of commercially available epoxy-containing compounds are products available under the tradenames CELLOXIDE™ 2021P, CELLOXIDE™ 8000 from Daicel Corporation, Japan, EPIKOTE™ RESIN 828 LVEL, EPIKOTE™ RESIN 166, EPIKOTE™ RESIN 169 from Momentive Specialty Chemicals B.V., Netherlands, Epilox™ resins of the product series A, T and AF from Leuna Harze, Germany, or EPICLON™ 840, 840-S, 850, 850-S, EXA850CRP, 850-LC from DIC K.K., Japan, Omnilane 1005 and Omnilane 2005 from IGM Resins B.V., Syna Epoxy 21 and Syna Epoxy 06 from Synasia Inc., TTA21, TTA26, TTA60 and TTA128 from Jiangsu Tetra New Material Technology Co. Ltd.

Oxetanes (A2)

Instead of or additionally to the epoxy-containing compound (A1) preferably at least difunctional oxetane-containing compounds (A2) can be used as cationically curable component (A) in the compositions. Methods of forming oxetanes are especially known from US 2017/0198093 A1.

Examples of commercially available oxetanes are bis(1-ethyl-3-oxetanyl-methyl)ether (DOX), 3-allyloxymethyl-3-ethyloxetane (AQX), 3-ethyl-3-[(phenoxy)methyloxetane (POX), 3-ethyl-3-hydroxymethyloxetane (OXA), 1,4-bis [(3-ethyl-3-oxetanylmethoxy)methyl]benzene (XDO), 3-ethyl-3-[(2-ethylhexyloxy)methyl]oxetane (EHOX). The oxetanes mentioned are commercially available from the company TOAGOSEI CO., LTD.

Vinyl Ethers (A3):

Instead of or additionally to compounds (A1) and (A2) vinyl ethers (A3) can be used as cationically curable components in the compositions of the present invention. Preferably, at least difunctional vinyl ethers are used. Suitable vinyl ethers are trimethylolpropane trivinyl ether, ethylene glycol divinyl ether, triethylene glycol divinyl ether (DVE-3), 1,4-butanediol divinyl ether (BDDVE), 1,4-cyclohexanedimethanol divinyl ether (CHDM-di), 1,2,3-tris(vinyloxy)propane, 1,3,5-tris[(2-vinyloxy)ethoxy]benzene, tris [4-(vinyloxy)butyl]1,2,4-benzene tricarboxylates, 1,3,5-tris (2-vinyloxyethyl)-1,3,5-triazine, 1,3,5-cyclohexanetrimethanol trivinyl ether, 1,1,1-tris-4-[2-(vinyloxy)ethoxy]phenylethane, tetrakis(vinyloxymethyl) methane as well as cyclic vinyl ethers and the mixtures thereof. Moreover, vinyl ethers of polyfunctional alcohols can be used.

Radically Curable Compounds (A4):

Instead of or additionally to compounds (A1) to (A3) further radically curable compounds (A4) can be used as resin component in the compositions. These are not further restricted with regard to their chemical structure. For example, both aliphatic and aromatic (meth)acrylates can be used. Here and in the following, the derivatives of both acrylic acid and methacrylic acid as well as combinations and mixtures thereof are designated as (meth)acrylates. The radically curable compounds (A4) are preferably radiation-curable.

The (meth)acrylates can be monofunctional or at least difunctional. Preferably, the (meth)acrylate compound that is radically curable by exposure to heat or radiation is at least difunctional. For example, the following radically curable compounds are suitable: isobornyl acrylate, stearyl acrylate, tetrahydrofurfuryl acrylate, cyclohexyl acrylate, 3,3,5-trimethylcyclohexanol acrylate, behenyl acrylate, 2-methoxyethyl acrylate and other mono- or polyfunctional alkoxylated alkyl acrylates, isobutyl acrylate, isooctyl acrylate, lauryl acrylate, tridecyl acrylate, isostearyl acrylate, 2-(o-phenylphenoxy)ethyl acrylate, acryloylmorpholine, N,N-dimethyl acrylamide, 4-butanediol diacrylate, 1,6-hexanediol diacrylate, 1,10-decanediol diacrylate, tricyclodecane dimethanol diacrylate, dipropyleneglycol diacrylate, tripropyleneglycol diacrylate, polybutadiene diacrylate, cyclohexane dimethanol diacrylate, diurethane acrylates of monomeric, oligomeric or polymeric diols and polyols, trimethylolpropane triacrylate (TMPTA) and dipentaerythritol hexaacrylate (DPHA) as well as combinations thereof. Moreover, acrylates of higher functionality derived from polybranched or dendrimeric alcohols can be used advantageously.

The analogous methacrylates are also in the sense of the invention.

Radiation-curable compounds (A4) having allyl groups, such as 1,3,5-triazine-2,4,6(1H,3H,5H)trione commercially available as TAICROS®, are also suitable. Unhydrogenated polybutadienes with free double bonds, for example the poly BD® types, can be used as radiation-curing compound (A4) as well.

Urethane acrylates based on polyesters, polyethers, polycarbonate diols and/or (hydrogenated) polybutadiene diols can also be used as component (A4) for a radiation-curable compound of higher molecular weight.

Component (B): Curing Agent and/or Initiator:

Apart from the curable resin component (A), the compositions contain a curing agent and/or an initiator for the polymerization of component (A). Here, the term "polymerization" is also meant to comprise the crosslinking of component (A). The curing agents are not further restricted with regard to their chemical nature and comprise, for example, one or more of the compounds named below:

Nitrogen-Containing Compounds (B1):

For example, nitrogen-containing compounds (B1) can be used as curing agent (B) for epoxy-containing compounds (A1).

Examples of suitable nitrogen-containing compounds comprise amines, in particular aliphatic polyamines, arylaliphatic polyamines, cycloaliphatic polyamines, aromatic polyamines and heterocyclic polyamines, as well as imidazoles, cyanamides, polyureas, Mannich bases, polyether polyamines, polyaminoamides, phenalkamines, sulfonamides, aminocarboxylic acids or combinations of the substance classes named. Reaction products of epoxides and/or anhydrides and the above-mentioned nitrogen-containing compounds can also be used as curing agent (B).

Carboxylic Acid Anhydrides (B2)

Carboxylic acid anhydrides (B2), for example, can also be used as curing agent (B) for epoxy-containing compounds (A1).

The anhydrides of diprotic carboxylic acids and aromatic tetraprotic carboxylic acids as well as mixtures thereof are particularly preferred.

Specific examples of anhydrides that can be used as curing agent in the compositions of the present invention comprise the anhydrides of diprotic acids, such as phthalic acid anhydride (PSA), succinic acid anhydride, octenyl succinic acid anhydride (OSA), pentadodecenyl succinic acid anhydride and other alkenyl succinic acid anhydrides, maleic acid anhydride (MA), itaconic acid anhydride (ISA), tetrahydrophthalic acid anhydride (THPA), hexahydrophthalic acid anhydride (HHPA), methyltetrahydrophthalic acid anhydride (MTHPA), methylhexahydrophthalic acid anhydride (MHHPA), nadic acid anhydride, 3,6-endomethylene tetrahydrophthalic acid anhydride, methylendomethylene tetrahydrophthalic acid anhydride (METH, NMA), tetrabromophthalic acid anhydride and trimellitic acid anhydride as well as the anhydrides of aromatic tetraprotic acids, such as biphenyltetracarboxylic acid dianhydrides, naphthalenetetracarboxylic acid dianhydrides, diphenylethertetracarboxylic acid dianhydrides, butanetetracarboxylic acid anhydrides, cyclopentanetetracarboxylic acid dianhydrides, pyromellitic acid anhydrides and benzophenonetetracarboxylic acid dianhydrides. These compounds can be used alone or in combination of two or more thereof.

For example, the preferred anhydrides for use as curing agent (B2) are commercially available under the following tradenames. MHHPA: tradenames HN-5500 (Hitachi Chemical Co., Ltd.) and MHHPA (Dixie Chemical Company, Inc.), METH: tradenames NMA (Dixie Chemical Company, Inc.), METH/ES (Polynt S.p.A.) and MHAC (Hitachi Chemical Co., Ltd.).

Thiols (B3)

Thiol-containing compounds (B3) having at least two thiol groups (—SH) in the molecule can also be used as curing agent (B) for epoxy-containing compounds (A1).

The thiols are not further restricted with regard to their structure. Preferably, primary of secondary thiols based on aliphatic or aromatic compounds are used. Polythioether acetals as disclosed in WO 2019082962A1 are also suitable.

Preferably, the at least difunctional thiol is selected from the group consisting of ester-based thiols having reactive thiol groups, polythioethers, polythioether acetals, polythioether thioacetals, polysulfides, thiol-terminated urethanes, thiol derivatives of isocyanurates and glycolurile as well as combinations thereof.

Examples of commercially available ester-based thiols based on 2-mercaptoacetic acid comprise trimethylolpropane trimercaptoacetate, pentaerythritol tetramercaptoacetate and glycol dimercaptoacetate, available under the tradenames Thiocure™ TMPMA, PETMA and GDMA from the company Bruno Bock.

Further examples of commercially available ester-based thiols comprise trimethylolpropane-tris(3-mercaptopropionate), pentaerythritol-tetrakis(3-mercaptobutylate), glycol-di(3-mercaptopropionate) and tris[2-(3-mercaptopropionyloxy)ethyl]isocyanurate, available under the tradenames Thiocure™ TMPMP, PETMP, GDMP and TEMPIC from the company Bruno Bock.

Examples of commercially available thioethers comprise DMDO (1,8-dimercapto-3,6-dioxaoctane), available from the company Arkema S.A., DMDS (dimercaptodiethyl sulfide) and DMPT (2,3-di((2-mercaptoethyl)thio)-1-propanethiol), both obtainable from the company Bruno Bock.

The use of tris(3-mercaptopropyl)isocyanurate (TMPI) as trifunctional ester-free thiol in the composition of the present invention is particularly preferred.

Preferably, the at least difunctional thiol (B3) is present in the composition of the present invention in a proportion of 10 to 80 wt-%, preferably 15 to 70 wt-%, each based on the total weight of all components.

Photoinitiators for Cationic Polymerization (B4)

The compositions of the present invention can contain a photoinitiator for cationic polymerization (B4). It can be activated by actinic radiation and comprises, for example, initiators based on metallocenium and/or onium compounds.

An overview of various metallocenium salts is disclosed in EP 0 542 716 B1. Examples of various anions of the metallocenium salts are $HSO_4^-$, $PF_6^-$, $SbF_6^-$, $AsF_6^-$, $Cl^-$, $Br^-$, $I^-$, $ClO_4^-$, $PO_4^-$, $SO_3CF_3^-$, $OTs^-$ (tosylate), aluminate and borate anions such as $BF_4^-$ and $B(C_6F_5)_4^-$.

Preferably, the photoinitiator based on metallocenium compounds is selected from the group of ferrocenium salts.

Preferred onium compounds are selected from the group of arylsulfonium salts and aryliodonium salts and combinations thereof, and are described in the state of the art.

Triarylsulfonium-based photoinitiators commercially available as photolatent acids are obtainable under the tradenames Chivacure 1176, Chivacure 1190 from the company Chitech, Irgacure 290, Irgacure 270, Irgacure GSID 26-1 from the company BASF, Speedcure 976 and Speedcure 992 from Lambson, TTA UV-692, TTA UV-694 from the company Jiangsu Tetra New Material Technology Co., Ltd. or UVI-6976 and UVI-6974 from the company Dow Chemical Co.

Diaryliodonium-based photoinitiators commercially available as photolatent acids are obtainable, for example, under the tradenames UV1242 or UV2257 from the company Deuteron and Bluesil 2074 from the company Bluestar.

The photoinitiators (C) used in the compositions of the present invention can preferably be activated by irradiation with actinic radiation of a wavelength of 200 to 480 nm.

Thermal Initiators for Cationic Polymerization (B5)

In addition to or instead of the photoinitiator (B4), the compositions of the present invention can also contain a thermal initiator for cationic polymerization. For example, quaternary N-benzylpyridinium salts and N-benzylammonium salts as disclosed in EP 0 343 690 or WO 2005 097 883 are suitable as thermal acidifiers. Besides, heat-latent sulfonium salts as described in WO 2019 043 778 A1 can be used as acidifier.

For example, commercially available products are obtainable under the designations K-PURE CXC-1614 or K-PURE CXC-1733 from King Industries Inc., SAN-AID SI-80L and SAN-AID SI-100L from the company SAN-SHIN Chemical Industry Co. Ltd.

In addition, various titanium- or aluminum-based metal-chelate complexes can be used as heat-latent acids.
Photoinitiators for Radical Polymerization (B6)

The compositions of the present invention can further contain a photoinitiator for radical polymerization (B6).

As photoinitiators, the common, commercially available compounds can be used, for example α-hydroxyketones, benzophenone, α,α'-diethoxyacetophenone, 4,4-diethylaminobenzophenone, 2,2-dimethoxy-2-phenylacetophenone, 4-isopropylphenyl-2-hydroxy-2-propylketone, 1-hydroxycyclohexylphenylketone, isoamyl-p-dimethylaminobenzoate, methyl-4-dimethylaminobenzoate, methyl-o-benzoylbenzoate, benzoine, benzoine ethylether, benzoine isopropylether, benzoine isobutylether, 2-hydroxy-2-methyl-1-phenylpropane-1-one, 2-isopropylthioxanthone, dibenzosuberone, 2,4,6-trimethylbenzoyldiphenylphosphine oxide and bisacylphosphine oxides, wherein the photoinitiators mentioned can be used alone or in combination of two or more of the compounds named.

As UV photoinitiators, for example, the IRGACURE™ types from BASF SE, e.g. the IRGACURE 184, IRGACURE 500, IRGACURE 1179, IRGACURE 2959, IRGACURE 745, IRGACURE 651, IRGACURE 369, IRGACURE 907, IRGACURE 1300, IRGACURE 819, IRGACURE 819DW, IRGACURE 2022, IRGACURE 2100, IRGACURE 784, IRGACURE 250, IRGACURE TPO, IRGACURE TPO-L types, can be used.

Moreover, the DAROCUR® types from BASF SE, e.g. the DAROCUR MBF, DAROCUR 1173, DAROCUR TPO and DAROCUR 4265 types, can be used.

The photoinitiator that can be used as component (B5) in the compositions of the present invention can preferably be activated by actinic radiation of a wavelength of 200 to 400 nm, particularly preferably of 250 to 365 nm.
Thermal Initiators for Radical Polymerization (B7)

Especially peroxy compounds of the perester, diacyl peroxide, peroxy(di)carbonate and/or hydroperoxide type can be used as thermal initiators in the compositions of the present invention. The use of hydroperoxides is preferred. Particularly preferred peroxides to be used are cumol hydroperoxide, tert-amylperoxy-2-ethylhexanoate and di-(4-tert-butyl-cyclohexyl)peroxy dicarbonate.

Based on the total weight of the composition, the peroxide (B7) is contained in a proportion of 0.1 to 10, preferably 0.5 to 5 and particularly preferably 1 to 3 wt-%.
Component (C): Polyacetal-Bridged Resin Component Apart from resin (A), the curing agent and/or the polymerization initiator (B), the compositions of the present invention contain component (C) comprising at least one polyacetal-bridged resin component. This component is essential in the compositions of the present invention and allows the cured compositions to be detached and/or dissolved in the presence of moisture. At the same time, component (C) allows the cured compositions to have a wide mechanical range, and makes it possible, for example, to avoid disadvantages with respect to the cohesion of the cured composition and/or high viscosities of the liquid curable composition.

According to the present invention component (C) is a non-linear polyacetal-bridged resin component that can be obtained by reacting at least one at least difunctional vinyl ether (c1) with at least one at least difunctional alcohol (c2) to form a polyacetal intermediate product having more than two terminal vinyl ether groups or more than two terminal hydroxyl groups, and (a) reacting the polyacetal intermediate product having more than two terminal vinyl ether groups with at least one compound of mixed functionality (c3) having at least one hydroxyl group or one amine group as well as at least one further functional group of resin component (A) or a group that can be polymerized therewith; or (b) reacting the polyacetal intermediate product having more than two terminal hydroxyl groups with an optionally at least difunctional hydroxyl group-reactive linker, for example a linker selected from the group of carboxylic acid anhydrides, at least difunctional carboxylic acid anhydrides and at least difunctional isocyanates, and further reacting it with the compound of mixed functionality (c3) or a difunctional resin component (A); or (c) reacting the polyacetal intermediate product having more than two terminal hydroxyl groups with a compound of mixed functionality (c3) having at least one isocyanate group and another functional group of resin component (A) or a group that can be polymerized therewith.

If, for example, an epoxy resin or an oxetane resin is used as resin component (A), component (C) has epoxy groups and/or oxetane groups as well. If resin component (A) contains radiation-curable (meth)acrylate groups, component (C) can also have such (meth)acrylate groups. If vinyl ether-based resin components (A) are used, a component (C) can be used that contains the vinyl ether groups or other cationically polymerizable groups such as epoxy groups or oxetane groups. Thus, component (C) is compatible with resin component (A) present in the curable composition and is reactively incorporated into the resin matrix under the polymerization conditions. The large number of polyacetal functions in component (C) caused by use of a non-linear polyacetal intermediate product having more than two terminal vinyl ether groups or other reactive terminal groups, ensures that the cured compositions can be quickly detached or dissolved.

Advantageously, the reaction of the at least difunctional vinyl ether (c1) with the at least difunctional alcohol (c2) and the at least one compound of mixed functionality (c3) to form component (C) can be performed as a single-stage synthesis.

The use of several differently structured polyacetal-bridged resin components (C) is also in the sense of the invention as long as the component of mixed functionality (c3) is selected such that the polyacetal-bridged resin component (C) has functional groups forming a resin matrix with at least one of resins (A) used.

By the additional use of compounds of mixed functionality (c3) that are different from each other hybrid compounds can be obtained. For example, polyacetal-bridged resin components (C) that have (meth)acrylate terminal groups as well as epoxy and/or oxetane terminal groups and can be reacted both in a radical and a cationic polymerization reaction can be obtained by the use of mixtures of hydroxy-functional (meth)acrylates and hydroxy-functional oxetanes and/or epoxides as component (c3). For example, such polyacetal-bridged resin components (C) can be used in epoxy acrylate hybrid formulations.

The use of compounds (c3) that do not have any groups corresponding to or being polymerizable with the resin used in component (A) is not preferred. Such polyacetal compounds do not allow the compositions of the present invention to be formulated as they cannot copolymerize with the curable composition and would thus cause poor cohesive properties in the cured compositions.

Formation of a branched polyacetal intermediate product having more than two terminal vinyl ether groups or hydroxyl groups is achieved by at least one of compounds (c1) or (c2) being trifunctional or of a higher functionality. If only difunctional vinyl ethers (c1) and difunctional alcohols (c2) are reacted with each other, only linear polyacetal compounds can be formed, resulting in compositions with a low glass transition temperature and a low network density, which are not in the sense of the invention.

The polyacetal-bridged compound (C) can have a molar mass in the range of 2000-20,000 g/mol, preferably 2000-8000 g/mol.

The use of several differently structured polyacetal compounds (C) is also in the sense of the invention as long as at least one of compounds (c1) or (c2) is trifunctional or of a higher functionality.

In the following, compounds c1, c2 and c3 used to form the polyacetal-bridged compound of mixed functionality (C) are explained in detail:

Compound (c1): At Least Difunctional Vinyl Ether

As compound (c1), aliphatic, cycloaliphatic and aromatic vinyl ethers can be used. Preferably, polar, di-, tri- and tetrafunctional vinyl ethers, preferably di- and trifunctional vinyl ethers such as diethyleneglycol divinyl ether (DVE-2), triethyleneglycol divinyl ether (DVE-3), 1,4-butanediol divinyl ether (BDDVE), 1,4-cyclohexanedimethanol divinyl ether (CHDM-di), 1,2,3-tris(vinyloxy)propane, trimethylpropane trivinyl ether, 1,3,5-tris[(2-vinyloxy)ethoxy]benzene, tris[4-(vinyloxy)butyl]1,2,4-benzene tricarboxylate, 1,3,5-tris(2-vinyloxyethyl)-1,3,5-triazine, 1,3,5-cyclohexanetrimethanol trivinyl ether, 1,1,1-tris-4-[2-(vinyloxy)ethoxy]phenylethane, tetrakis(vinyloxymethyl)methane, are used.

Compound (c2): At Least Difunctional Alcohol

As compound (c2), di- or polyfunctional primary and secondary aliphatic, cycloaliphatic and aromatic alcohols can be used. Preferably, di-, tri-, tetra- and pentafunctional alcohols are used, particularly preferably tri- and tetrafunctional alcohols. Suitable alcohols include 1,3-propane diol, 1,4-butane diol, 2,3-butane diol, 1,2-cyclopentane diol, 1,5-pentane diol, 1,3-cyclohexane diol, 1,4-cyclohexane diol, 2,5-hexane 1,4-cyclohexane dimethanol, 1,3-diol, benzyldimethanol, 4,8-bis(hydroxymethyl)tricyclo[5.2.1.0]2.6decane, dipropyleneglycol, 1,1,1-trimethylolpropane, glycerol, 1,2,6-hexanetriol, 2,6-bis(hydroxymethyl)-p-cresol, pyrogallol, phloroglucinol, pentaerythrit, ribose, arabinose, xylose, lyxose, ribulose and xylulose. Mixtures of dipropyleneglycol and 1,1,1-trimethylolpropane are especially preferred.

Compound of Mixed Functionality (c3):

In one embodiment, compound (c3) comprises at least one hydroxy- and/or amine function and at least one further functional group that is selected from the functional groups of resins (A) or can polymerize with them. In addition, compound (c3) is not further restricted with regard to its structure.

For example, the further functional group can have epoxy, oxetane, vinyl ether and/or (meth)acrylate functionalities. Preferably, the further functional group of the compound of mixed functionality is an epoxy group, a (meth)acrylate group and combinations thereof.

Examples of epoxy-functional compounds (c3) are pre-extended epoxy resins.

Examples of oxetane-functional compounds (c3) are 1-(oxirane-2-yl)ethane-1-ol, 2-(oxirane-2-yl)ethane-1-ol, 2-(oxirane-2-yl)-1-phenylethane-1-ol, 2-[(oxirane-2-yl) methoxy]ethane-1-ol, 3-ethyl-3-(hydroxymethyl)oxetane (Aron Oxetan OXT-101).

Examples of (meth)acrylate-functional compounds (c3) are 2-hydroxyethyl acrylate, 4-hydroxybutyl acrylate, hydroxyethylhexyl acrylate, hydroxyisobutyl acrylate, 2-hydroxymethyl acrylate, hydroxyethylhexyl methacrylate.

Examples of vinyl-functional compounds (c3) are 2-hydroxyethyl vinyl ether, hydroxybutyl vinyl ether (HBVE), diethyleneglycol vinyl ether, triethyleneglycol vinyl ether, 1,4-cyclohexanedimethanol vinyl ether, 3-aminopropyl vinyl ether (APVE).

The examples mentioned are not to be construed as final or limiting.

In the compositions of the present invention, component (C) is contained in a proportion of at least 20 wt-%, preferably at least 40 wt-% and particularly preferably at least 50 wt-%. For complete dissolubility in the presence of moisture proportions of more than 50 wt-% are preferred.

Synthesis of Polyacetal-Bridged Compound (C):

Synthesis of compound (C) can be performed in one or two stages. In the case of a one-stage synthesis, all reaction partners (c1, c2 and c3) are mixed and brought to a temperature of 20-100° C., preferably 20-80° C., for 1-24 hours, preferably 1-6 hours, while stirring, in the presence of an acid as catalyst. After the reaction is completed, the catalyst is neutralized by addition of an amine, preferably a secondary amine. The resulting salt and excessive amine can be removed, for example, by filtration.

In the case of a two-stage synthesis, a polyacetal intermediate product having more than two hydroxy groups can be formed in the first step by reacting compounds (c1) and (c2), which can then be further functionalized by methods known to those skilled in the art using linkers such as difunctional isocyanates (HDI, IPDI), dicarboxylic acid halogenides (oxalyl chloride) or dicarboxylic acid anhydrides (MHTPA, MHHPA, glutaric acid anhydride) and suitable compounds of mixed functionality (c3). Moreover, the polyacetal intermediate product having more than two hydroxy groups can be reacted with compounds of mixed functionality which have a hydroxyl group-reactive functional group, for example an isocyanate group, and another functional group of resin component (A) or a group that can be polymerized with it to form component (C).

(D) Accelerator

To shorten the time until detachment and/or dissolution in the presence of moisture, additional accelerators can be added to the compositions. Especially blowing agents (D1) such as, for example, inorganic carbonates, tartrates, polyphosphates, azo compounds, azides and expandable microspheres are used.

As further accelerators acids (D2) can be used. Particularly organic acids such as acrylic acid, oxalic acid, citric acid or p-toluenesulfonic acid are suitable.

The use of photolatent acids releasing an acid when irradiated is also possible.

In the compositions of the present invention, the accelerators (D) can be used alone or in combination.

In the compositions of the present invention, component (D) is contained in a proportion of 0-15 wt-%, preferably 0-10 wt-% and particularly preferably 1-5 wt-%.

13

Component (E): Additives

In addition, the described compositions can contain optional constituents as additives (E). Preferably, the additives (E) are selected from the group of fillers, dyes, pigments, anti-aging agents, fluorescent agents, stabilizers, polymerization accelerators, sensitizers, adhesive agents, desiccants, crosslinking agents, flow improvers, wetting agents, thixotropic agents, diluents, flexibilizers, polymeric thickeners, flame retardants, corrosion inhibitors, plasticizers and tackifiers.

The above list of additives is to be considered as exemplary rather than limiting.

Formulation of the Compositions of the Present Invention

A formulation of the compositions of the present invention comprises at least components (A) to (C). In addition, accelerators (D) and additives (E) can be contained.

In a first embodiment, the composition comprises or consists of the following components, each based on the total weight of the composition:

(A) 1 to 70 wt-% of the at least one curable resin component (A);

(B) 0.001 to 70 wt-% of the at least one curing agent and/or the at least one initiator for the polymerization of the curable resin component;

(C) 20 to 95 wt-% of the at least one polyacetal-bridged resin component;

(D) 0 to 15 wt-% of an accelerator;

(E) 0 to 70 wt-% of further additives from the group of fillers, dyes, pigments, anti-aging agents, fluorescent agents, stabilizers, polymerization accelerators, sensitizers, adhesive agents, desiccants, crosslinking agents, flow improvers, wetting agents, thixotropic agents, reactive and non-reactive diluents, flexibilizers, polymeric thickeners, flame retardants, corrosion inhibitors, plasticizers, tackifiers and combinations thereof.

The compositions of the present invention are preferably provided as one-pack compositions.

Use of the Compositions of the Present Invention

The compositions of the present invention are especially suitable for forming bondings, coatings and encapsulations that can be re-dissolved and detached. With expensive parts, for example, they can be applied as a protective layer during the fabrication process and subsequently removed under mild conditions. Use as a joining solution for electronics applications in conjunction with a recycling at the end of the device's life span allowing the parts to be recovered is also conceivable.

In particular, the composition is suitable as a support material for the fabrication of additively manufactured parts. The compositions have the advantage over comparable materials that, under mild conditions, they can be removed from the part leaving essentially no residues. As the polyacetal-bridged resin component (C) is incorporated into the resin matrix, the cured compositions are characterized by both good cohesion and reliable mechanical properties as long as they are not exposed to the detachment conditions.

Moreover, the compositions can be used as a temporary fixation material for the manufacture of so-called fan-out wafer level packages (FOWLP). In particular, the compositions are suitable as temporary carriers for processes as published in the scientific publication by T. Braun, M. Topper and K.-D. Lang, "Opportunities of Fan-out Wafer Level Packaging (FOWLP) for RF applications", IEEE, 16*th* Topical Meeting on Silicon Monolithic Integrated Circuits in RF Systems (SiRF) 2016.

Curing of the Compositions of the Present Invention

The compositions of the present invention can be cured by heat and/or actinic radiation, in particular UV radiation. The polyacetal-bridged resin component (C) does not have any impact on the typical curing conditions as it polymerizes into the resin matrix.

Measuring Methods/Devices and Definitions Used

Below, measuring methods and definitions used in relation to the compositions and experiments shown in Table 1 will be explained.

Irradiation

To activate the photoinitiators (B), the compositions of the present invention were irradiated for a duration of 60 s with a DELOLUX 20/365 LED lamp from the company DELO Industrie Klebstoffe GmbH & Co. KGaA with an emission maximum at 365 nm with an intensity of $200\pm20$ mW/cm$^2$.

Curing

"Crosslinking" or "curing" are defined as a polymerization or addition reaction beyond the gel point. The gel point is the point at which the storage modulus G' becomes equal to the loss modulus G". Curing of the specimens is performed at room temperature for 7 days.

Room Temperature

Room temperature is defined as $23\pm2°$ C.

Verification of the Progress of the Reaction Used to Form Component (C)

The progress of the reaction used to form the polyacetal intermediate product and the subsequent reaction with the compound of mixed functionality (c3) was evaluated by means of IR spectroscopy. To this end, an ALPHA infrared spectrometer from the company Bruker was used, and the change of the below mentioned vibration bands was tracked. Once the relevant band has disappeared and/or the band does not change anymore, the reaction is considered as completed.

Testing of the Detachment and Dissolution Properties of the Compositions

To evaluate the detachability of the compositions of the present invention, two specimens (dimensions 20 mm*20 mm*5 mm) made of glass and aluminum with an overlapping of 5 mm and a layer thickness of 0.1 mm are bonded to each other using the respective composition.

After successful curing, the specimens were attached to a weight by means of a clamp and placed in a water bath at 80° C. (pH 7). The time passing until the joint connection breaks up is measured. After break-up of the joint connection, the specimens are removed and checked for residual traces of the cured composition.

To determine the dissolubility of the compositions of the present invention, a film of the compositions to be tested of a size of 3×3 cm and a thickness of 200 μm was cured at 365 nm for 60 s. Then the film was placed in a water bath with a pH of 3 at 80° C. Once no residues of the film could be detected visually, the time was recorded.

Determination of the Glass Transition Temperature

DSC measurements of the reactivity and glass transition were performed with a differential scanning calorimeter (DSC) of the DSC 822e or DSC 823e type from the company Mettler Toledo.

To this end, 16-20 mg of the liquid sample is weighted into an aluminum crucible (40 μl) using a pin, the crucible is closed with a lid provided with holes, and the sample is measured with the following segments: (1) isothermal, 0° C., 2 min; (2) dynamic 0-250° C., 10° K/min; (3) dynamic 250-0° C., −10° K/min; (4) isothermal, 0° C., 3 min; (5) dynamic 0-250° C., 20° K/min. In all segments, the process gas is air (volume flow rate 30 ml/min).

The heating segments (2) and (5) are evaluated with regard to reactivity and glass transition, respectively. The reaction enthalpy is determined by means of a spline curve as base line and scaled to the weighted sample, with its amount being given as exothermic energy. Glass transition is analyzed using the tangent method.

Determination of the Elongation at Break

Shouldered bars of a defined size (dimensions 25×5.5×2 mm, measuring distance 10×2×2 mm) were cast from the compositions. The shouldered bars were irradiated for 60 s from each side (DELOLUX 20/365; intensity: 200 mW/cm$^2$). Subsequently, the shouldered bars were drawn apart in a tensile testing machine from the company Zwick at a speed of 30 mm/min, and the cohesion and elongation at break were determined according to DIN EN ISO 527.

Examples of the Formulation

Component (A): Cationically Polymerizable Constituents
(A1) Epoxy-Containing Compounds
    (A1-1): 3,4-epoxycyclohexylmethyl-3',4'-epoxycyclo-hexane carboxylate, obtainable under the tradename Celloxide 2021 P from the company Daicel
(A2) Oxetane-Containing Compounds
    (A2-1): OXT-221=bis[1-ethyl(3-oxetanyl)]methyl ether, obtainable from the company Toagosei
(A4) Radically Curable (Radiation-Curable) Compounds
    (A4-1): Acrylic acid, obtainable from the company Sigma-Aldrich
    (A4-2): SR256=2(2-ethoxyethoxy)ethyl acrylate, obtainable from the company Sartomer
    (A4-3): SR495B=caprolactone acrylate, obtainable from the company Sartomer
    (A4-4): DMAA=N,N-dimethylacrylamide
Component (B): Curing Agent and/or Initiator
(B4) Cationic Photoinitiator
    (B4-1): Irgacure 290=tris(4-((4-acetylphenyl)thio)phe-nyl)sulfoniumtetrakis-(perfluorophenyl)borate, obtainable from the company IGM Resins
(B6) Radical Photoinitiator
    (B6-1): Irgacure 819=bis(2,4,6-trimethylbenzoyl)phe-nylphosphine oxide, obtainable from the company IGM Resins
Examples of the Synthesis of Polyacetal Compounds (C):
(c1) at Least Difunctional Vinyl Ether
    (c1-1): Triethylene glycol divinyl ether, obtainable from the company BASF SE
(c2) at Least Difunctional Alcohol
    (c2-1) Dipropylene glycol
    (c2-2) 1,1,1-Tris(hydroxymethly)propane
(c3) Compound of Mixed Functionality
    (c3-1) OXT-101=3-ethyloxetane-3-methanol, obtainable from the company Toagosei
    (c3-2) 4-Hydroxybutyl acrylate
    (c3-3) Karenz AOI=2-isocyanatoethyl acrylates, obtainable from the company Showa Denko
Component (D): Accelerators
(D1) Acidic Accelerators
    (D1-1): Oxalic acid
(D2) Expanding Microspheres
    (D2-1): Expancel Partikel 031 DUX 40, obtainable from the company Nouryon
Component (E): Additives
    (E1-1): Thixotropic agent HDK N 20, obtainable from the company Wacker (C1): Formation of an Oxetane-Functionalized Polyacetal A baked-out vessel is filled with 80.0 g (0.388 mol, 11 Eq.) of triethylene glycol divinyl ether (c1-1), 38.2 g (0.282 mol, 8 Eq.) of dipropyleneglycol (c2-1), 4.73 g (0.035 mol, 1 Eq.) of 1,1,1-tris(hydroxymethly)propane (c2-2), 13.3 g (115 mol, 3.25 Eq.) of Aron OXT-101 (c3-1) and 222 mg (2.47 mmol, 0.07 Eq.) of oxalic acid (D1-1) under a nitrogen atmosphere. Then, the reaction mixture is kept at 80° C. under continuous stirring until no change of the OH vibra-tion band at 3405 cm$^{-1}$ can be observed in the IR.

After that, 260 ml of acetic acid ethyl ester is added to the reaction mixture, and 6.8 g of activated carbon is added under vigorous stirring. Then, the solid is filtered off and the supernatant solvent is removed under reduced pressure. 100 g (74%) of the oxetane-functionalized polyacetal (C1) with a viscosity of 1,461 mPas was obtained.

(C2) Formation of an Epoxy-Functionalized Polyacetal

A baked-out vessel is filled with 175 g (0.865 mol, 8.5 Eq.) of triethyleneglycol divinyl ether (c1-1), 117 g (0.865 mol, 8.5 Eq.) of dipropyleneglycol (c2-1), 13.7 g (0.102 mol, 1 Eq.) of 1,1,1-tris(hydroxymethly)propane (c2-2) and 640 mg (7.13 mmol, 0.07 Eq.) of oxalic acid (D1-1) under a nitrogen atmosphere. Then, the reaction mixture is heated to 85° C. for 4 h under continuous stirring. After that, 220 mg (1.95 mmol, 0.077 Eq.) of 1,4-diazabicyclo[2.2.2]octane is added to the reaction mixture, and the mixture is homog-enized.

Then, 300 ml of acetic acid ethyl ester is added to the reaction mixture, and 15.3 g of activated carbon is added under vigorous stirring. After that, the solid is filtered off and the supernatant solvent is removed under reduced pressure. 275 g (96%) of polyacetal intermediate product I was obtained as an oil.

100 g (0.063 mol, 1 Eq.) of the polyacetal intermediate product I is heated to 55° C. under dry air, and 14.0 g (0.120 mol, 1.9 Eq.) of glutaric acid anhydride is added. After that, 680 mg (4.43 mmol, 0.07 Eq.) of 1,8-diazabicycloundecene is added, and the reaction mixture is stirred for 4 h at 80° C.

133 g (0.528 mol, 8.35 Eq.) of 7-oxabicyclo[4.1.0]hept-3-ylmethyl-7-oxabicyclo[4.1.0]heptan-3-carboxylate (A1-1) is added and stirred until no change of the COOH vibration bands between 3070 cm-1 and 3290 cm-1 can be observed in the IR. After the reaction is completed, 240 g (97%) of the epoxy-functionalized polyacetal (C2) with a viscosity of 3,386 mPas is obtained.

(C3) Formation of an Acrylate-Functionalized Polyacetal

A baked-out vessel is filled with 30.0 g (0.145 mol, 18 Eq.) of triethyleneglycol divinyl ether (c1-1), 18.6 g (0.137 mol, 17 Eq.) of dipropyleneglycol (c2-1), 1.08 g (8.08 mmol, 1 Eq.) of 1,1,1-tris(hydroxymethly)propane (c2-2), 2.33 g (0.016 mmol, 2 Eq.) of 4-hydroxybutyl acrylate (c3-2), 102 mg (1.13 mmol, 0.14 Eq.) of oxalic acid (D1-1), 10.7 mg (0.05 mmol, 6 mEq.) of butylhydroxytoluene and 12.3 mg (0.10 mmol, 0.012 Eq.) of 4-methoxyphenol. Then, the reaction mixture is kept at 80° C. under continuous stirring until no change of the OH vibration band at 3488 cm-1 can be observed in the IR.

45 g (88%) of the acrylate-functionalized polyacetal (C3) with a viscosity of 1,812 mPas was obtained.

(C4) Formation of a Diisocyanate-Linked Acrylate-Func-tionalized Polyacetal 8.44 g (0.038 mol, 2 Eq.) of isophorone diisocyanate is added to 30 g (0.019 mol, 1 Eq.) of polyacetal intermediate product I under dry air. Then, 26.5 mg (0.02 mmol, 1.1 mEq.) of bismuth neodecanoate is added twice, and the reaction mixture is stirred for 5 h at 80° C.

After that, 5.47 g (0.038 mol, 2 Eq.) of 4-hydroxybutyl acrylate (c3-2) is added, and the reaction is stirred until no change of the NCO vibration band at 2262 cm$^{-1}$ can be observed in the IR. 39 g (98%) of the acrylate-functionalized polyacetal (C4) with a viscosity of 169,670 mPas was obtained.

Formation of Monoisocyanate-Linked Acrylate-Functional Polyacetals (C5-C9)

First, the polyacetal intermediate products II to V were formed from the vinyl ether (c1-1) and the polyols (c2-1) and (c2.-2) in the presence of oxalic acid (D1-1) according to the equivalents stated in Table 1, following the synthesis of polyacetal intermediate product I.

After that, a baked-out vessel with 1 Eq. of the polyacetal intermediates I-V is filled with 7 mEq. of butylhydroxytoluene (BHT) and 14 mEq. of 4-methoxyphenole (HOMME) under a nitrogen atmosphere. Then, 2 Eq. of the compound of mixed functionality (c3-3; Karenz AOI) and 3.5 mEq. of bismuth neodecanoate are added. The reaction mixture is kept at 70° C. under continuous stirring until no change of the NCO vibration bands (2239-2275 cm-1) could be detected in the IR.

The acrylate-functional polyacetals (C5-C9) are obtained from the polyacetal intermediates I to V as oils in yields of >90%.

TABLE 1

Synthesis of the polyacetal-bridged resin components C5-C9

| | Polyacetal intermediate | | | | |
|---|---|---|---|---|---|
| | I | II | III | IV | V |
| c1-1 [Eq.] | 8.5 | 7.5 | 8.5 | 8.5 | 8.5 |
| c2-1 [Eq.] | 8.5 | 8.5 | 11 | 7.5 | 5.5 |

18

TABLE 1-continued

Synthesis of the polyacetal-bridged resin components C5-C9

| | Polyacetal intermediate | | | | |
|---|---|---|---|---|---|
| | I | II | III | IV | V |
| c2-2 [Eq.] | 1 | 1 | 1 | 2.5 | 3 |
| D1-1 [Eq.] | 0.07 | 0.062 | 0.074 | 0.07 | 0.055 |
| Viscosity [mPas] | 4,050 | 2,843 | 2,326 | 3,883 | 75,615 |
| Ideal number of acetals* | 18 | 14.5 | 17 | 15 | 13 |
| Polyacetal | C5 | C6 | C7 | C8 | C9 |

*Ideal number of acetals $P_i$ = [theoretical number of polyacetal links]; assuming that each vinyl group of (c1-x) is reacted with a hydroxy function of (c2-x) to form a polyacetal group.

(C10) Formation of an Unfunctionalized Polyacetal

A baked-out vessel is filled with 60.0 g (0.300 mol, 8.5 Eq.) of triethyleneglycol divinyl ether (c1-1), 40.2 g (0.300 mol, 8.5 Eq.) of dipropyleneglycol (c2-1), 4.68 g (0.025 mol, 1 Eq.) of 1,1,1-tris(hydroxymethly)propane (c2-2), 7.76 g (0.105 mol, 3 Eq.) of 1-butanol and 220 mg (2.40 mmol, 0.07 Eq.) of oxalic acid (D1-1) under a nitrogen atmosphere. Then, the reaction mixture is heated to 85° C. under continuous stirring until no vinyl vibration band at 1618 cm-1 can be observed in the IR.

110 g (98%) of the unfunctionalized polyacetal (C10) with a viscosity of 223 mPas containing no functional groups of resin component (A) was obtained.

TABLE 2

Examples of the formulation of the present invention (proportions in wt-%, based on the total weight of the formulation)

| | | Example | | | | | |
|---|---|---|---|---|---|---|---|
| Components | | 1 | 2 | 3 | 4 | 5 | 6 |
| (A) | (A1-1) | | 22.5 | 23.2 | | | |
| | (A2-1) | 25.7 | 11 | 11.3 | | | |
| | (A4-1) | | | | 19 | 9.8 | 9.78 |
| | (A4-2) | | | | 9.5 | 4.9 | 4.9 |
| | (A4-3) | | | | 9.5 | 4.9 | 4.9 |
| | (A4-4) | | | | 8.6 | 4.4 | 4.42 |
| (B) | B4-1 | 0.5 | 0.5 | 0.5 | | | |
| | B6-1 | | | | 1 | 1 | 1 |
| | C1 | | 632 | 64.8 | | | |
| (C) | C2 | 71 | | | | | |
| | C3 | | | | 47.6 | 50 | |
| | C5 | | | | | | |
| | C6 | | | | | | |
| | C7 | | | | | | 70 |
| | C8 | | | | | | |
| | C9 | | | | | | |
| (D) | D1-1 | | | 0.2 | | | |
| | D2-1 | | | | | 20 | |
| (E) | E1-1 | 2.8 | 2.8 | | 4.8 | 5 | 5 |
| | Elastic modulus [MPa] | N/A | N/A | N/A | 0.2 | N/A | 8.0 |
| | Glass transition temperature [° C.] | −14 | −20 | N/A | −65 | −61 | −35 |
| | Elongation at break [%] | N/A | N/A | N/A | 54 | N/A | 16 |
| | Time until detachment [min] | 71.6 | 24.6 | 12.0 | 20.9 | 7.9 | 14.0 |
| | Time until dissolution [h] | N/A | N/A | N/A | >48 | 24 | N/A |

TABLE 2-continued

Examples of the formulation of the present invention (proportions in wt-%, based on the total weight of the formulation)

| Components | | Example 7 | 8 | 9 | 10 | 11 | 12 |
|---|---|---|---|---|---|---|---|
| (A) | (A1-1) | | | | | | |
| | (A2-1) | | | | | | |
| | (A4-1) | 9.78 | 9.78 | 9.78 | 27.7 | 19 | 9.8 |
| | (A4-2) | 4.9 | 4.9 | 4.9 | 12.9 | 9.5 | 4.9 |
| | (A4-3) | 4.9 | 4.9 | 4.9 | 12.9 | 9.5 | 4.9 |
| | (A4-4) | 4.42 | 4.42 | 4.42 | 8.9 | 8.6 | 4.4 |
| (B) | B4-1 | | | | | | |
| | B6-1 | 1 | 1 | 1 | 1 | 1 | 1 |
| | C1 | | | | | | |
| (C) | C2 | | | | | | |
| | C3 | | | | | | |
| | C5 | | | | 29.7 | 47.6 | 70 |
| | C6 | | 70 | | | | |
| | C7 | | | | | | |
| | C8 | 70 | | | | | |
| | C9 | | | 70 | | | |
| (D) | D1-1 | | | | | | |
| | D2-1 | | | | | | |
| (E) | E1-1 | 5 | 5 | 5 | 6.9 | 4.8 | 5 |
| | Elastic modulus [MPa] | 5.4 | 6.3 | 4.1 | | | |
| | Glass transition temperature [° C.] | −44 | −43 | −50 | −32 | −40 | −52 |
| | Elongation at break [%] | 18 | 15 | 22 | N/A | N/A | N/A |
| | Time until detachment [min] | 19.1 | 21.6 | 24.1 | 32.6 | 14.2 | 11.7 |
| | Time until dissolution [h] | 12 | N/A | N/A | N/A | N/A | N/A |

TABLE 3

Comparative Examples (proportions in wt-%, based on the total weight of the formulation)

| Example | Components | 13 | 14 |
|---|---|---|---|
| (A) | (A1-1) | | |
| | (A2-1) | | |
| | (A4-1) | 9.78 | 33.5 |
| | (A4-2) | 4.9 | 15.6 |
| | (A4-3) | 4.9 | 15.6 |
| | (A4-4) | 4.42 | 10.8 |
| (B) | B4-1 | | |
| | B6-1 | 1 | 1.2 |
| (C) | C5 | | 15 |
| | C10 | 70 | |
| (E) | E1-1 | | 8.4 |
| | Elastic modulus [MPa] | N/A | N/A |
| | Glass transition temperature [° C.] | N/A | N/A |
| | Elongation at break [%] | N/A | N/A |
| | Time until detachment | >1 w | >1 d |

Compositions 1-3 of the present invention comprise cationically curable systems, each of which containing an oxetane-functionalized polyacetal-bridged resin component (C1) or an epoxy-functional polyacetal-bridged resin component (C2). The composition of Example 2 based on the oxetane-functionalized polyacetal-bridged resin component (C2) is detached almost three times as fast as the composition of Example 1 based on (C2). By adding 0.2 parts by weight of an acidic accelerator (Example 3 of the present invention) the detachment time can already be reduced by further 12 minutes.

In Examples 4 and 5 of the present invention based on acrylate-containing formulations, the detachment time can also be accelerated by almost one third by adding expandable microspheres (D2-1). The compositions of the present invention of Example 5 can be dissolved within 24 h without leaving any residues.

The influence of the number of acetals, which is a measure of the number of acetal functions in component (C), becomes evident in Examples 6-9 of the present invention. As the number of acetals increases, the time until detachment is shortened as well. The compositions of Example 6 of the present invention (theoretical number of acetals: 17) are detached within 14 minutes, while the compositions of Example 9 with 13 acetals are detached within 24 minutes.

Examples 10-12 of the compositions of the present invention in conjunction with Comparative Example 14 show the lower limit of the proportion of the polyacetal-bridged resin component (C). In Comparative Example 14, the proportion of the polyacetal is below 20 wt-%. The time until detachment is more than one day. Examples 10-12 of the present invention show that the detachment time is shortened as the proportion of polyacetal (C) increases.

Comparative Example 13 contains the unfunctionalized polyacetal (C10) in a proportion of 70 wt-%. Despite the high proportion, the cured composition requires more than one week to be detached from the substrate. As the polyacetal (C10) is not incorporated into the polymeric network, Comparative Example 13 is not in accordance with the present invention.

The invention claimed is:

1. A curable composition that is liquid at room temperature, comprising:
   A) at least one curable resin component selected from a group consisting of epoxy-containing compounds, oxetanes, vinyl ethers, (meth)acrylates, silanes and combinations thereof;
   B) at least one curing agent and/or one initiator for the polymerization of the at least one curable resin component; and
   C) at least one polyacetal-bridged resin component that is obtained by reacting at least one at least difunctional vinyl ether (c1) with at least one at least difunctional alcohol (c2) to form a polyacetal intermediate product having more than two terminal vinyl ether groups or more than two terminal hydroxyl groups, and a) reacting the polyacetal intermediate product having more than two terminal vinyl ether groups with at least one compound of mixed functionality (c3) having at least one hydroxyl group or one amine group and at least one further functional group of resin component (A) or a group that can be polymerized therewith; or b) reacting the polyacetal intermediate product having more than two terminal hydroxyl groups with a hydroxyl group-reactive linker and further reacting it with the compound of mixed functionality (c3) or a difunctional resin component (A); or c) reacting the polyacetal intermediate product having more than two terminal hydroxyl groups with a compound of mixed functionality (c3) having at least one isocyanate group and another functional group of resin component (A) or a group that can be polymerized therewith;

wherein at least one of the at least difunctional vinyl ether (c1) and the at least difunctional alcohol (c2) is trifunctional or of a higher functionality.

2. The composition according to claim 1, wherein the reaction of the at least difunctional vinyl ether (c1) with the at least difunctional alcohol (c2) and the at least one compound of mixed functionality (c3) is performed in a single-stage synthesis.

3. The composition according to claim 1, wherein resin component (A) comprises an epoxy-containing compound and/or an oxetane, and that the composition comprises a curing agent (B1) selected from the group of amines and/or anhydrides.

4. The composition according to claim 1, wherein resin component (A) comprises an epoxy-containing compound, an oxetane and/or a vinyl ether, and that the composition comprises an initiator for cationic polymerization.

5. The composition according to claim 1, wherein the resin component comprises a radically curable (meth)acrylate compound, and that the composition comprises an initiator for radical polymerization.

6. The composition according to claim 1, wherein the resin component comprises an epoxy-containing compound and/or an oxetane as well as a radiation-curable compound, or comprises a hybrid compound having epoxy groups and radiation-curable groups, and that the composition comprises a curing agent from the group of amines and/or anhydrides as well as additionally an initiator for radical polymerization.

7. The composition according to claim 1, wherein the at least difunctional vinyl ether (c1) is selected from the group consisting of aliphatic, cycloaliphatic, aromatic vinyl ethers and combinations thereof.

8. The composition according to claim 1, wherein the at least difunctional alcohol is selected from the group consisting of primary and secondary aliphatic, cycloaliphatic and aromatic alcohols and combinations thereof.

9. The composition according to claim 1, wherein the further functional group of the compound of mixed functionality (c3) comprises an epoxy group, a (meth)acrylate group and combinations thereof.

10. The composition according to claim 1, wherein the compound of mixed functionality is selected from glycidol, pre-extended epoxy resins, 1-(oxirane-2-yl) ethane-1-ol, 2-(oxirane-2-yl) ethane-1-ol, 2-(oxirane-2-yl)-1-phenylethane-1-ol, 2-[(oxirane-2-yl) methoxy] ethane-1-ol, 3-ethyl-3-(hydroxymethyl) oxetane, 2-hydroxyethyl acrylate, 4-hydroxybutyl acrylate, hydroxyethylhexyl acrylate, hydroxyisobutyl acrylate, 2-hydroxymethyl acrylate, hydroxyethylhexyl methacrylate, 2-hydroxyethyl vinyl ether, hydroxybutyl vinyl ether (HBVE), diethyleneglycol vinyl ether, triethyleneglycol vinyl ether, 1,4-cyclohexanedimethanol vinyl ether, 3-aminopropyl vinyl ether (APVE) and combinations thereof.

11. The composition according to claim 1, wherein the polyacetal-bridged resin component (C) has a molecular weight in the range of 2000-20,000 g/mol.

12. The composition according to claim 1, wherein the polyacetal-bridged resin component (C) is present in the composition in a proportion of at least 20 wt-%, based on the total weight of the composition.

13. The composition according to claim 1, wherein the composition further comprises an accelerator from the group of blowing agents and organic acids.

14. The composition according to claim 1, wherein the composition comprises of the following components, each based on a total weight of the composition:

1 to 70 wt-% of the at least one curable resin component (A);

0.001 to 70 wt-% of the at least one curing agent and/or the at least one initiator for the polymerization of the at least one curable resin component;

20 to 95 wt-% of the at least one polyacetal-bridged resin component;

0 to 15 wt-% of an accelerator for the hydrolytic cleavage of polyacetals; and 0 to 70 wt-% of further additives from the group of fillers, dyes, pigments, anti-aging agents, fluorescent agents, stabilizers, polymerization accelerators, sensitizers, adhesive agents, desiccants, crosslinking agents, flow improvers, wetting agents, thixotropic agents, reactive and non-reactive diluents, flexibilizers, polymeric thickeners, flame retardants, corrosion inhibitors, plasticizers, tackifiers and combinations thereof.

15. A method of forming and re-dissolving a joint connection, comprising:

a composition according to claim 1 is applied to a first substrate, and the composition is brought into contact with at least one further substrate, forming an adhesive joint;

b) the adhesive joint is cured by exposure to heat and light, whereby a cured joint connection is formed; and c) the cured joint connection is exposed to moisture for a predetermined period of time and at a predetermined temperature, whereby the cured joint connection is dissolved and/or detached from the substrates.

16. A method, including the step of using Use of the composition according to claim 1 as a temporary support material for additively manufactured structures.

17. The composition according to claim 7, wherein the vinyl ether is a polar vinyl ether with a functionality of two to four.

18. The composition according to claim 17, wherein the vinyl ether is selected from diethyleneglycol divinyl ether (DVE-2), triethyleneglycol divinyl ether (DVE-3), 1,4-butanediol divinyl ether (BDDVE), 1,4-cyclohexanedimethanol divinyl ether (CHDM-di), 1,2,3-tris(vinyloxy) propane, trimethylpropane trivinyl ether, 1,3,5-tris[(2-vinyloxy) ethoxy] benzene, tris[4-(vinyloxy)butyl] 1,2,4-benzene tricarboxylate, 1,3,5-tris(2-vinyloxyethyl)-1,3,5-triazine, 1,3,5-cyclohexanetrimethanol trivinyl ether, 1,1,1-tris-4-[2-(vinyloxy) ethoxy] phenylethane, tetrakis(vinyloxymethyl) methane and combinations thereof.

19. The composition according to claim 8, wherein the alcohol has a functionality of two to five.

20. The composition according to claim 19, wherein the alcohol is selected from dipropyleneglycol, 1,1,1-trimethylolpropane, glycerol, 1,2,6-hexanetriol, 2,6-bis(hydroxymethyl)-p-cresol, pyrogallol, phloroglucinol, pentaerythrit, ribose, arabinose, xylose, lyxose, ribulose, xylulose and combinations thereof.

21. The composition according to claim 11, wherein the polyacetal-bridged resin component (C) has a molecular weight in the range of 2000-8000 g/mol.

22. The composition according to claim 12, wherein the polyacetal-bridged resin component (C) is present in the composition in a proportion of at least 40 wt-%, based on the total weight of the composition.

23. The composition according to claim 22, wherein the polyacetal-bridged resin component (C) is present in the composition in a proportion of at least 50 wt-%, each based on the total weight of the composition.

\* \* \* \* \*